United States Patent
Clerkin et al.

Patent No.: US 12,172,101 B2
Date of Patent: Dec. 24, 2024

(54) HARMFUL SUBSTANCE REMOVAL SYSTEM AND METHOD (71) Applicant: HEARTLAND WATER TECHNOLOGY, INC., St. Louis, MO (US)

(72) Inventors: Craig Clerkin, Stoughton, WI (US); Benjamin N. Laurent, Cottage Grove, WI (US)

(73) Assignee: HEARTLAND TECHNOLOGY PARTNERS LLC, St. Louis, MO (US)

(*) Notice: Subject to any disclaimer, the term of this patent is extended or adjusted under 35 U.S.C. 154(b) by 0 days.

(21) Appl. No.: 18/196,785

(22) Filed: May 12, 2023

(65) Prior Publication Data
US 2023/0277955 A1    Sep. 7, 2023

Related U.S. Application Data (63) Continuation of application No. 16/888,186, filed on May 29, 2020, now abandoned.
(Continued)

(51) Int. Cl.
B01D 1/14      (2006.01)
B01D 1/30      (2006.01)
(Continued)

(52) U.S. Cl.
CPC ............... B01D 1/14 (2013.01); B01D 1/305 (2013.01); C02F 1/004 (2013.01); C02F 1/048 (2013.01);
(Continued)

(58) Field of Classification Search
CPC .. B01D 1/14; B01D 1/305; B01D 1/16; C02F 1/048; C02F 1/10; C02F 1/283; C02F 1/12
See application file for complete search history.

(56) References Cited

U.S. PATENT DOCUMENTS 2,372,846 A   4/1945   Frederick et al.
2,387,818 A   10/1945  Wethly
(Continued)

FOREIGN PATENT DOCUMENTS

CL   757-2004     5/2007
CN   1262236 A    8/2000
(Continued)

OTHER PUBLICATIONS

"Gas Atomized Venturi Scrubbers," Bionomic Industries, copyright 2008, printed from www.bionomicind.com <http://www.bionomicind.com> on May 25, 2011.
(Continued)

Primary Examiner — Renee Robinson
(74) Attorney, Agent, or Firm — MARSHALL, GERSTEIN & BORUN LLP (57) ABSTRACT A harmful substance removal system and method include a direct contact liquid concentrator having a gas inlet, a gas outlet, a mixing chamber disposed between the gas inlet and the gas outlet, and a liquid inlet for importing liquid into the mixing chamber. Gas and liquid mixing in the are mixed chamber and a portion of the liquid is vaporized. A demister is disposed downstream of the mixing chamber. The demister includes at least one stage of mist elimination having a first filter that removes particles greater than 9 microns. A fan is coupled to the demister to assist gas flow through the mixing chamber.

18 Claims, 4 Drawing Sheets

Related U.S. Application Data (60) Provisional application No. 62/855,563, filed on May 31, 2019.

(51) Int. Cl.
   *C02F 1/00* (2023.01)
   *C02F 1/04* (2023.01)
   *C02F 1/10* (2023.01)
   *C02F 1/28* (2023.01)
   C02F 101/36 (2006.01)
   C02F 103/06 (2006.01)

(52) U.S. Cl.
   CPC ............... *C02F 1/10* (2013.01); *C02F 1/283* (2013.01); *C02F 2101/36* (2013.01); *C02F 2103/06* (2013.01); *C02F 2301/046* (2013.01); *C02F 2303/16* (2013.01)

(56) References Cited

U.S. PATENT DOCUMENTS

| | | |
|---|---|---|
| 2,468,455 A | 4/1949 | Metziger |
| 2,560,226 A | 7/1951 | Joos et al. |
| 2,619,421 A | 11/1952 | Greenfield |
| 2,651,647 A | 9/1953 | Greenfield |
| 2,658,349 A | 11/1953 | Keller |
| 2,658,735 A | 11/1953 | Ybarrondo |
| 2,721,065 A | 10/1955 | Ingram |
| 2,790,506 A | 4/1957 | Vactor |
| 2,867,972 A | 1/1959 | Hokderreed et al. |
| 2,879,838 A | 3/1959 | Flynt et al. |
| 2,890,166 A | 6/1959 | Heinze |
| 2,911,421 A | 11/1959 | Greenfield |
| 2,911,423 A | 11/1959 | Greenfield |
| 2,925,223 A | 2/1960 | Reddick |
| 2,979,408 A | 4/1961 | Greenfield |
| 2,981,250 A | 4/1961 | Steward |
| 3,060,921 A | 10/1962 | Luring et al. |
| 3,076,715 A | 2/1963 | Greenfield |
| 3,113,046 A | 12/1963 | Reddick |
| 3,203,875 A | 8/1965 | Harris |
| 3,211,538 A | 10/1965 | Gross et al. |
| 3,212,235 A | 10/1965 | Markant |
| 3,251,398 A | 5/1966 | Greenfield |
| 3,268,443 A | 8/1966 | Cann |
| 3,284,064 A | 11/1966 | Kolm et al. |
| 3,299,651 A | 1/1967 | McGrath |
| 3,304,991 A | 2/1967 | Greenfield |
| 3,306,039 A | 2/1967 | Peterson |
| 3,323,575 A | 6/1967 | Greenfield |
| 3,405,918 A | 10/1968 | Calaceto et al. |
| 3,432,399 A | 3/1969 | Schutt |
| 3,488,686 A | 1/1970 | Dunwoody et al. |
| 3,539,549 A | 11/1970 | Greenfield |
| 3,546,851 A | 12/1970 | Hardison et al. |
| 3,578,892 A | 5/1971 | Wilkinson |
| 3,601,374 A | 8/1971 | Wheeler |
| 3,638,924 A | 2/1972 | Calaceto et al. |
| 3,704,570 A | 12/1972 | Gardenier |
| 3,713,786 A | 1/1973 | Umstead |
| 3,716,458 A | 2/1973 | Greenfield et al. |
| 3,730,673 A | 5/1973 | Straitz, III |
| 3,743,483 A | 7/1973 | Shah |
| 3,754,869 A | 8/1973 | Van Raden |
| 3,756,580 A | 9/1973 | Dunn |
| 3,756,893 A | 9/1973 | Smith |
| 3,762,893 A | 10/1973 | Larsen |
| 3,782,300 A | 1/1974 | White et al. |
| 3,789,902 A | 2/1974 | Shah et al. |
| 3,826,096 A | 7/1974 | Hrusch |
| 3,838,974 A | 10/1974 | Hemsath et al. |
| 3,838,975 A | 10/1974 | Tabak |
| 3,840,002 A | 10/1974 | Douglas et al. |
| 3,855,079 A | 12/1974 | Greenfield et al. |
| 3,870,585 A | 3/1975 | Kearns et al. |
| 3,876,490 A | 4/1975 | Tsuruta |
| 3,880,756 A | 4/1975 | Raineri et al. |
| 3,898,134 A | 8/1975 | Greenfield et al. |
| 3,901,643 A | 8/1975 | Reed et al. |
| 3,915,620 A | 10/1975 | Reed |
| 3,917,508 A | 11/1975 | Greenfield et al. |
| 3,925,148 A | 12/1975 | Erwin |
| 3,944,215 A | 3/1976 | Beck |
| 3,945,331 A | 3/1976 | Drake et al. |
| 3,947,215 A | 3/1976 | Peterson et al. |
| 3,947,327 A | 3/1976 | Greenfield et al. |
| 3,950,230 A | 4/1976 | Greenfield et al. |
| 3,994,671 A | 11/1976 | Straitz, III |
| 4,001,077 A | 1/1977 | Kemper |
| 4,007,094 A | 2/1977 | Greenfield et al. |
| 4,012,191 A | 3/1977 | Lisankie et al. |
| 4,013,516 A | 3/1977 | Greenfield et al. |
| 4,026,682 A | 5/1977 | Pausch |
| 4,036,576 A | 7/1977 | McCracken |
| 4,070,423 A | 1/1978 | Pierce |
| 4,079,585 A | 3/1978 | Helleur |
| 4,080,883 A | 3/1978 | Zink et al. |
| 4,092,908 A | 6/1978 | Straitz, III |
| 4,118,173 A | 10/1978 | Shakiba |
| 4,119,538 A | 10/1978 | Yamauchi et al. |
| 4,140,471 A | 2/1979 | Straitz et al. |
| 4,154,570 A | 5/1979 | Schwartz |
| 4,157,239 A | 6/1979 | Reed |
| 4,181,173 A | 1/1980 | Pringle |
| 4,185,685 A | 1/1980 | Giberson |
| 4,198,198 A | 4/1980 | Straitz, III |
| 4,227,897 A | 10/1980 | Reed |
| 4,230,536 A | 10/1980 | Sech |
| 4,257,746 A | 3/1981 | Wells |
| 4,259,185 A | 3/1981 | Mixon |
| 4,264,826 A | 4/1981 | Ullmann |
| 4,270,974 A | 6/1981 | Greenfield et al. |
| 4,273,658 A | 6/1981 | Karman |
| 4,276,115 A | 6/1981 | Greenfield et al. |
| 4,285,578 A | 8/1981 | Yamashita et al. |
| 4,300,924 A | 11/1981 | Coyle |
| 4,306,858 A | 12/1981 | Simon |
| 4,336,101 A | 6/1982 | Greenfield et al. |
| 4,346,660 A | 8/1982 | McGill |
| RE31,185 E | 3/1983 | Greenfield et al. |
| 4,430,046 A | 2/1984 | Cirrito |
| 4,432,914 A | 2/1984 | Schiffner |
| 4,440,098 A | 4/1984 | Adams |
| 4,445,464 A | 5/1984 | Gerstmann et al. |
| 4,445,842 A | 5/1984 | Syska |
| 4,450,901 A | 5/1984 | Janssen |
| 4,474,477 A | 10/1984 | Smith et al. |
| 4,485,746 A | 12/1984 | Erlandsson |
| 4,496,314 A | 1/1985 | Clarke |
| 4,518,458 A | 5/1985 | Greenfield et al. |
| 4,538,982 A | 9/1985 | McGill et al. |
| 4,583,936 A | 4/1986 | Krieger |
| 4,608,120 A | 8/1986 | Greenfield et al. |
| 4,613,409 A | 9/1986 | Volland |
| 4,642,919 A | 2/1987 | Werner et al. |
| 4,648,973 A | 3/1987 | Hultholm et al. |
| 4,652,233 A | 3/1987 | Hamazaki et al. |
| 4,658,736 A | 4/1987 | Walter |
| 4,683,062 A | 7/1987 | Krovak et al. |
| 4,689,156 A | 8/1987 | Zibrida |
| 4,693,304 A | 9/1987 | Volland |
| 4,756,769 A | 7/1988 | Booij |
| 4,761,077 A | 8/1988 | Werner |
| 4,771,708 A | 9/1988 | Douglass, Jr. |
| 4,818,392 A | 4/1989 | Werner et al. |
| 4,838,184 A | 6/1989 | Young et al. |
| 4,863,644 A | 9/1989 | Harrington et al. |
| 4,877,532 A | 10/1989 | Haentjens et al. |
| 4,882,009 A | 11/1989 | Santoleri et al. |
| 4,890,672 A | 1/1990 | Hall |
| 4,909,730 A | 3/1990 | Roussakis et al. |
| 4,913,065 A | 4/1990 | Hemsath |
| 4,917,577 A | 4/1990 | Stirling |
| 4,938,899 A | 7/1990 | Oros et al. |

(56) References Cited

U.S. PATENT DOCUMENTS

| | | |
|---|---|---|
| 4,952,137 A | 8/1990 | Schwartz et al. |
| 4,954,147 A | 9/1990 | Galgon |
| 4,961,703 A | 10/1990 | Morgan |
| 4,971,214 A | 11/1990 | Lillywhite et al. |
| 5,004,484 A | 4/1991 | Stirling et al. |
| 5,009,511 A | 4/1991 | Sarko et al. |
| 5,028,298 A | 7/1991 | Baba et al. |
| 5,030,428 A | 7/1991 | Dorr et al. |
| 5,032,230 A | 7/1991 | Shepherd |
| 5,043,104 A | 8/1991 | Stirling |
| 5,045,202 A | 9/1991 | Stearns et al. |
| 5,068,092 A | 11/1991 | Aschauer |
| 5,076,895 A | 12/1991 | Greenfield et al. |
| 5,085,809 A | 2/1992 | Stirling |
| 5,092,909 A | 3/1992 | Werner et al. |
| 5,102,503 A | 4/1992 | Silinski et al. |
| 5,131,757 A | 7/1992 | Smith |
| 5,132,090 A | 7/1992 | Volland |
| 5,154,898 A | 10/1992 | Ajinkya et al. |
| 5,167,821 A | 12/1992 | Tanbo et al. |
| 5,176,798 A | 1/1993 | Rodden |
| 5,183,563 A | 2/1993 | Rodden |
| 5,227,017 A | 7/1993 | Tanaka et al. |
| 5,230,167 A | 7/1993 | Lahoda et al. |
| 5,238,580 A | 8/1993 | Singhvi |
| 5,279,356 A | 1/1994 | Bruhn |
| 5,279,646 A | 1/1994 | Schwab |
| 5,300,123 A | 4/1994 | Grott |
| 5,314,622 A | 5/1994 | Stirling |
| 5,336,284 A | 8/1994 | Schifftner |
| 5,342,482 A | 8/1994 | Duesel, Jr. |
| D350,838 S | 9/1994 | Johnson |
| 5,347,958 A | 9/1994 | Gordon, Jr. |
| 5,423,979 A | 6/1995 | Allen |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,648,048 A | 7/1997 | Kuroda et al. |
| 5,656,155 A | 8/1997 | Norcross et al. |
| 5,662,802 A | 9/1997 | Heins et al. |
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,772,843 A | 6/1998 | Rhodes |
| 5,792,313 A | 8/1998 | Johansson |
| 5,810,578 A | 9/1998 | Hystad et al. |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,085,911 A | 7/2000 | Greenleigh et al. |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,500,216 B1 | 12/2002 | Takayasu |
| 6,585,899 B1 | 7/2003 | Edvardsson et al. |
| 6,616,733 B1 | 9/2003 | Pellegrin |
| 6,632,083 B1 | 10/2003 | Bussman et al. |
| 6,656,250 B1 | 12/2003 | Listner et al. |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 | 5/2007 | Duesel, Jr. et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 8,066,844 B2 | 11/2011 | Duesel, Jr. et al. |
| 8,066,845 B2 | 11/2011 | Duesel, Jr. et al. |
| 8,114,287 B2 | 2/2012 | Harris |
| 8,136,797 B2 | 3/2012 | Duesel, Jr. et al. |
| 8,459,984 B2 | 6/2013 | Duesel, Jr. et al. |
| 8,518,257 B2 | 8/2013 | Galgon et al. |
| 8,535,538 B1 | 9/2013 | Keeling et al. |
| 8,557,117 B2 | 10/2013 | Galgon et al. |
| 8,568,557 B2 | 10/2013 | Duesel, Jr. et al. |
| 8,623,174 B1 | 1/2014 | Duesel, Jr. et al. |
| 8,679,291 B2 | 3/2014 | Duesel, Jr. et al. |
| 8,721,771 B2 | 5/2014 | Duesel, Jr. et al. |
| 8,741,100 B2 | 6/2014 | Duesel, Jr. |
| 8,741,101 B2 | 6/2014 | Duesel, Jr. |
| 8,790,496 B2 | 7/2014 | Duesel, Jr. et al. |
| 8,801,897 B2 | 8/2014 | Duesel, Jr. et al. |
| 8,821,728 B2 | 9/2014 | Galgon et al. |
| 8,882,967 B1 | 11/2014 | Patel |
| 9,199,861 B2 | 12/2015 | Duesel, Jr. et al. |
| 9,296,624 B2 | 3/2016 | Duesel, Jr. et al. |
| 9,738,553 B2 | 8/2017 | Chidambaran et al. |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2003/0192595 A1 | 10/2003 | Benson |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2004/0079491 A1 | 4/2004 | Harris et al. |

(56) References Cited

U.S. PATENT DOCUMENTS

| | | |
|---|---|---|
| 2005/0022989 A1 | 2/2005 | Heins |
| 2005/0049449 A1 | 3/2005 | Forrester |
| 2005/0074712 A1 | 4/2005 | Brookshire et al. |
| 2005/0230238 A1 | 10/2005 | Klausner et al. |
| 2005/0242036 A1 | 11/2005 | Harris |
| 2005/0274669 A1 | 12/2005 | Marchesseault et al. |
| 2005/0279500 A1 | 12/2005 | Heins |
| 2006/0000355 A1 | 1/2006 | Ogura et al. |
| 2006/0032630 A1 | 2/2006 | Heins |
| 2007/0045100 A1 | 3/2007 | Wright |
| 2007/0051513 A1 | 3/2007 | Heins |
| 2007/0084808 A1 | 4/2007 | Williamson et al. |
| 2007/0102154 A1 | 5/2007 | Grott |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0000390 A1 | 1/2009 | Duhanyan et al. |
| 2009/0014387 A1 | 1/2009 | Probst |
| 2009/0020481 A1 | 1/2009 | Bailie et al. |
| 2009/0078416 A1 | 3/2009 | Heins |
| 2009/0127091 A1 | 5/2009 | Heins |
| 2009/0152193 A1* | 6/2009 | Yamasaki ............ C02F 3/06 210/150 |
| 2009/0294074 A1 | 12/2009 | Forstmanis |
| 2009/0294377 A1 | 12/2009 | Gallot |
| 2010/0038310 A1 | 2/2010 | Shafer et al. |
| 2010/0095763 A1 | 4/2010 | Harris |
| 2010/0125044 A1 | 5/2010 | Keister |
| 2010/0126931 A1 | 5/2010 | Capeau et al. |
| 2010/0138168 A1 | 6/2010 | Pinguet et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0224561 A1 | 9/2010 | Marcin |
| 2010/0236724 A1 | 9/2010 | Duesel, Jr. et al. |
| 2010/0264068 A1 | 10/2010 | Ikebe et al. |
| 2011/0005999 A1 | 1/2011 | Randal |
| 2011/0061816 A1 | 3/2011 | Duesel, Jr. et al. |
| 2011/0083556 A1 | 4/2011 | Duesel, Jr. et al. |
| 2011/0100924 A1 | 5/2011 | Duesel, Jr. et al. |
| 2011/0108471 A1 | 5/2011 | Page et al. |
| 2011/0132815 A1 | 6/2011 | Angelilli et al. |
| 2011/0137465 A1 | 6/2011 | Angelilli et al. |
| 2011/0147195 A1 | 6/2011 | Shapiro et al. |
| 2011/0168646 A1 | 7/2011 | Tafoya |
| 2011/0174447 A1 | 7/2011 | Duesel, Jr. et al. |
| 2011/0180470 A1 | 7/2011 | Harris |
| 2011/0240540 A1 | 10/2011 | Harris |
| 2012/0012309 A1 | 1/2012 | Noles, Jr. |
| 2012/0171091 A1 | 7/2012 | DiTommaso et al. |
| 2012/0186451 A1 | 7/2012 | Duesel, Jr. et al. |
| 2012/0205303 A1 | 8/2012 | Rosine et al. |
| 2012/0211441 A1 | 8/2012 | Harris |
| 2012/0273367 A1 | 11/2012 | Themy et al. |
| 2012/0279925 A1 | 11/2012 | Miller et al. |
| 2012/0292176 A1 | 11/2012 | Machhammmer et al. |
| 2013/0036948 A1 | 2/2013 | Fernandez et al. |
| 2013/0037223 A1 | 2/2013 | Duesel, Jr. |
| 2013/0048562 A1 | 2/2013 | Keister |
| 2013/0048575 A1 | 2/2013 | Gruber et al. |
| 2014/0041811 A1 | 2/2014 | Duesel, Jr. et al. |
| 2014/0083938 A1 | 3/2014 | Galgon et al. |
| 2014/0316722 A1 | 10/2014 | Szabo et al. |
| 2015/0157953 A1 | 6/2015 | Duesel, Jr. et al. |
| 2016/0341585 A1 | 11/2016 | Liu |
| 2017/0191863 A1 | 7/2017 | Army et al. |
| 2019/0143241 A1 | 5/2019 | Duesel, Jr. et al. |

FOREIGN PATENT DOCUMENTS

| | | | |
|---|---|---|---|
| CN | 101445290 A | 6/2009 | |
| CN | 108275744 A | 7/2018 | |
| CN | 207861936 U | 9/2018 | |
| DE | 556 455 C | 8/1932 | |
| DE | 1 173 429 B | 7/1964 | |
| EP | 0 047 044 A1 | 3/1982 | |
| EP | 1 371 790 A1 | 12/2003 | |
| EP | 1 482 243 A1 | 12/2004 | |
| FR | 2 441 817 A1 | 6/1980 | |
| GB | 383570 A | 11/1932 | |
| GB | 463770 A | 4/1937 | |
| JP | 60-257801 | 12/1985 | |
| JP | 62-121687 | 6/1987 | |
| JP | 06-142448 A | 5/1994 | |
| JP | 2003-021471 A | 1/2003 | |
| JP | 2004-097866 A | 4/2004 | |
| JP | 2004-249226 A | 9/2004 | |
| JP | 2007-117874 A | 5/2007 | |
| KR | 200195548 Y1 | 9/2000 | |
| RU | 2090512 C1 | 9/1997 | |
| SU | 808088 A1 | 2/1981 | |
| SU | 1599031 A1 | 10/1990 | |
| WO | WO-96/10544 A2 | 4/1996 | |
| WO | WO-2004/022194 A2 | 3/2004 | |
| WO | WO-2004/022487 A2 | 3/2004 | |
| WO | WO-2005/110608 A1 | 11/2005 | |
| WO | WO-2008/112793 A1 | 9/2008 | |
| WO | WO-2009/071763 A1 | 6/2009 | |
| WO | WO-2010/092265 A1 | 8/2010 | |
| WO | WO-2011/032275 A1 | 3/2011 | |
| WO | WO-2011/042693 A2 | 4/2011 | |
| WO | WO-2011/050317 A2 | 4/2011 | |
| WO | WO-2012/100074 A2 | 7/2012 | |
| WO | WO-2017210752 A1 * | 12/2017 | ........ B01F 23/23123 |
| WO | WO-2018027273 A1 * | 2/2018 | ............... C02F 1/28 |
| WO | WO-2018097875 A1 * | 5/2018 | .............. C02F 1/283 |

OTHER PUBLICATIONS

"Waste Heat Recovery Systems," Bionomic Industries, copyright 2008, printed from www.bionomicind.com <http://www.bionomicind.com> on May 25, 2011.

Alabovskij et al., "Concentration of Boiler Washing Water in Submerged-Combustion Devices," *Promyshl. Energet*, 4:38-39 (1975). English-language abstract only.

Alabovskij et al., "Concentration of Boiler Washing Water in Submerged-Combustion Devices," Promyshl. Energet, 4:38-39 (1975). English-lanuage abstract only.

Bachand et al., "Denitrification In Constructed Free-Water Surface Wetlands: II. Effects Of Vegetation And Temperature," Ecological Engineering, 14:17-32 (2000).

Barrett et al., "The Industrial Potential And Economic Viability Of Spouted Bed Processes," Chemeca 85, paper D4c, The Thirteenth Australasian Conference On Chemical Engineering, Perth, Australia, pp. 401-405 (1985).

Bennett et al., "Design Of A Software Application For The Simulation And Control Of Continuous And Batch Crystallizer Circuits," Advances in Engineering Software, 33:365-374 (2002).

Berg, "The Development Of The Controlled Buoyancy System For Installation Of Submerged Pipelines," Journal AWWA, Water Technology/Quality, pp. 214-218 (1977).

Brandt et al., "Treatment Process For Waste Water Disposal Of The "Morcinek" Mine Using Coalbed Methane," Conference On Coalbed Methane Utilization, Oct. 5-7, 1994.

Canadian Office Action for Application No. 2,751,720, dated Nov. 14, 2016.

Cherednichenko et al., "Disposal Of Saline Wastes From Petroleum Refineries, All-Union Scientific-Research and Planning-Design Insti- (56) References Cited

OTHER PUBLICATIONS tute of the Petroleum Refining and Petrochemical Industry," Khimiya I Tekhnologiya Topliv I Masel, 9:37-39 (1974). Translated.
Chinese Office Action for Application No. 201180014846.5, dated Jun. 18, 2013.
Claflin et al., "The Use Of Spouted Beds For The Heat Treatment Of Grains," Chemeca 81, The 9th Australasian Conference on Chemical Engineering, Christchurch, New Zealand, 4:65-72 (1981).
Claflin, "Intraparticle Conduction Effects On The Temperature Profiles In Spouted Beds," Chemeca 85, paper D9b, The Thirteenth Australasian Conference On Chemical Engineering, Perth, Australia, pp. 471-475 (1985).
Cross et al., "Leachate Evaporation By Using Landfill Gas," Proceedings Sardinia 97, Sixth Landfill Symposium, S. Margherita di Pula, Cagliari, Italy, pp. 413-422 (1997).
Decision to Grant for Russian Application No. 2012137951/05, dated Apr. 1, 2015.
Dunn, "Incineration's Role In Ultimate Disposal Of Process Wastes," *Chemical Engineering, Deskbook* Issue, pp. 141-150 (1975).
Durkee et al., "Field Tests Of Salt Recovery System For Spent Pickle Brine," *Journal of Food Service*, 38:507-511 (1973).
English language translation of an office action from Chilean Patent Application No. 237-2007.
English translation of Chinese First Office Action for Application No. 201080012067.7, dated Oct. 12, 2012.
English translation of Chinese Office Action for Application No. 201080034380.0., dated Nov. 11, 2013.
English translation of Chinese Office Action for Application No. 201080034380.0, dated Jul. 1, 2014.
English translation of Chinese Search Report for Application No. 201080012067.7, dated Sep. 12, 2012.
English Translation of First Office Action in Russian Application No. 2012104408 dated Aug. 12, 2014.
English Translation of Office Action in Japanese Application No. 2012523024 dated Jul. 2, 2014.
English-language translation of Hage, H., "The MeMon Experiment: A Step towards Large-Scale Processing of Manure," Applied Science, 4 (1988).
Etzensperger et al., "Phenol Degradation In A Three-Phase Biofilm Fluidized Sand Bed Reactor," *Bioprocess Engineering*, 4:175-181 (1989).
European Examination Report for Application No. 13820641.2, dated Apr. 6, 2017.
European Office Action for Application No. 13820641.2, dated Dec. 13, 2017.
EVRAS—Evaporative Reduction and Solidification Systems; Brochure for Web. Believed to be publically available as early as Mar. 5, 2010.
Examination Report for Australian Application No. 2017202980, dated Jul. 5, 2018.
Fan et al., "Some Remarks On Hydrodynamic Behavior Of A Draft Tube Gas-Liquid-Solid Fluidized Bed," AIChE Symposium Series, No. 234(80):91-97 (1985).
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
Fox et al., "Control Mechanisms of Flulidized Solids Circulation Between Adjacent Vessels," *AIChE Journal*, 35(12): 1933-1941 (1989).
Gaudlip et al.; "Marcellus Shale Water Management Challenges in Pennsylvania," SPE Shale Gas Production Conference, Fort Worth (2008).
Genck, "Guidelines For Crystallizer Selection And Operation," CEP, pp. 26-32 (2004). www.cepmagazine.org.
German Kurz, "Immersion Heater," Oi U. Gasfeuerung, 18(3):171-180 (1973). English-language abstract only.
Hattori et al., "Fluid and Solids Flow Affecting the Solids Circulation Rate in Spouted Beds with a Draft Tube," *Journal of Chemical Engineering of Japan*, 37(9):1085-1091 (2004).
Hill et al., "Produced Water and Process heat Combined Provide Opportunities for Shell CO2"; EVRAS; Facilities 2000: Facilities Engineering in the Next Millennium.
Hocevar et al., "The Influence Of Draft-Tube Pressure Pulsations On The Cavitation-Vortex Dynamics In A Francis Turbine," *Journal of Mechanical Engineering*, 49:484-498 (2003).
International Preliminary Report on Patentability for International application No. PCT/US2016/029434 dated Oct. 31, 2017.
International Preliminary Report on Patenability for Internatinal application No. PCT/US2013/051315, dated Jan. 20, 2015.
International Preliminary Report on Patentability and Written Opinion issued for International Patent application No. PCT/US2011/021811, dated Aug. 14, 2012.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
International Preliminary Report on Patentability for Application No. PCT/US2008/056702, dated Sep. 15, 2009.
International Preliminary Report on Patentability for Application No. PCT/US2010/043647, dated Feb. 9, 2012.
International Preliminary Report on Patentability for Application No. PCT/US2010/043648, dated Feb. 9, 2012.
International Preliminary Report on Patentability for Application No. PCT/US2012/021897, dated Aug. 1, 2013.
International Preliminary Report on Patentability for Application No. PCT/US2012/021897, dated Jul. 23, 2013.
International Preliminary Report on Patentability for Application No. PCT/US2014/022307, dated Sep. 15, 2015.
International Preliminary Report on Patentability for application No. PCT/US2014/063818, issued May 10, 2016.
International Preliminary Report on Patentability for International application No. PCT/US2013/074971, dated Jun. 16, 2015.
International Preliminary Report on Patentability for International application No. PCT/US2014/022307, dated Sep. 15, 2015.
International Search Report and Written Opinion for Application No. PCT/US08/56702, dated Jun. 10, 2008.
International Search Report and Written Opinion for Application No. PCT/US10/043647, dated Apr. 27, 2011.
International Search Report and Written Opinion for Application No. PCT/US10/043648, dated Apr. 27, 2011.
International Search Report and Written Opinion for Application No. PCT/US2006/015803, dated Oct. 30, 2007.
International Search Report and Written Opinion for Application No. PCT/US2010/024143, dated Oct. 12, 2010.
International Search Report and Written Opinion for Application No. PCT/US2013/051315, dated Nov. 26, 2013.
International Search Report and Written Opinion for Application No. PCT/US2013/074971, dated May 22, 2014.
International Search Report and Written Opinion for Application PCT/US2011/021811, dated Mar. 21, 2011.
International Search Report for Application No. PCT/US2006/028515, dated Nov. 14, 2006.
International Search Report for Application No. PCT/US2012/021897, dated Oct. 8, 2012.
International Search Report for International application No. PCT/US2014/063818, mailed Feb. 25, 2015.
Intevras Technologies, LLC—Innovative solutions for water purification, remediation and process improvement; Power Point Presentation, Oct. 2009.
Japanese Office Action for Patent Application No. 2011-550282, dispatched on May 14, 2014.

(56) References Cited

OTHER PUBLICATIONS

Japanese Office Action for Patent Application No. 2012-552886, mailed Jan. 7, 2015.
Jones, "Liquid Circulation in a Draft-Tube Bubble Column," *Chemical Engineering Science*, 40(3):449-462 (1985).
Layne Evaporative Reduction and Solidification System Brochure (2010).
LFG Specialties, LLC, Waste Heat Leachate Evaporator System, Jan. 14, 2011.
MikroPul, "Wet Scrubbers," (2009). www.mikropul.com.
Miyake et al., "Performance Characteristics Of High Speed-Type Cross Flow Turbine," 83-0047:2575-2583 (1993).
Mueller et al., "Rotating Disk Looks Promising For Plant Wastes," (2007).
Mussatti, Daniel, Section 6, Particulate Matter Controls. Chapter 2 Wet Scrubbers for Particulate Matter. Innovative Strategies and Economics Group. Unisted States Environmental Protection Agency. Jul. 2002.
Notice of Allowance for U.S. Appl. No. 11/625,159, dated Jul. 9, 2010.
Notice of Reasons for Refusal for Japanese Application No. 2012-523025, dated Apr. 15, 2015.
Notice of Reasons for Refusal for Japanese Application No. 2012-523026, dated Apr. 15, 2015.
Office Action for Brazilian Application No. PI1008631.5, dated Jan. 2, 2019.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Office Action for U.S. Appl. No. 11/625,024, dated Nov. 27, 2009.
Office Action for U.S. Appl. No. 13/649,535, dated Sep. 26, 2014, 8pgs.
Office Action for U.S. Appl. No. 12/530,484, dated Apr. 16, 2013.
Office Action for U.S. Appl. No. 12/530,484, dated Feb. 29, 2012.
Office Action for U.S. Appl. No. 12/530,484, dated Oct. 17, 2012.
Office Action for U.S. Appl. No. 12/846,337, dated Apr. 17, 2013.
Office action from Chilean Patent Application No. 238-2007.
Office Action issued for U.S. Appl. No. 12/705,462, dated Nov. 6, 2012.
Office Action issued for U.S. Appl. No. 12/846,257, dated Nov. 16, 2012.
Padial et al., "Three-Dimensional Simulation Of A Three-Phase Draft-Tube Bubble Column," *Chemical Engineering Science*, 55:3261-3273 (2000).
Partial International Search Report for Application No. PCT/US2016/029434, dated Jul. 15, 2016.
Rule 62 EPC Communication issued from the European Patent Office for Application No. 10741828.7, dated Jan. 31, 2013.
Rule 62 EPC Communication issued from the European Patent Office for Application No. 10805026.1, dated Feb. 27, 2013.
Rule 62 EPC Communication issued from the European Patent Office for Application No. 10805027.9, dated Feb. 5, 2013.
Sathyanarayana et al., Circular C.W. Intake System—A Research Opinion, Seventh Technical Conference of the British Pump Manufacturer's Association, paper 21, pp. 293-313, 1981.
Schone, "Oil Removal from Exhaust Steam and Condensate of Piston-Powered Steam Engines," *Braunkohle*, 31:82-92 (1932). English-language abstract only.
Screen shots from video on LFG website taken Jan. 18, 2011 (http://www.shawgrp.com/markets/envservices/envsolidwaste/swlfg).

Search Report for Chinese Patent Application No. 201180014846.5, dated Jun. 8, 2013.
Search Report for International application No. PCT/US2016/029434, mailed Oct. 4, 2016.
Search Report for PCT/US2014/015007, mailed Nov. 12, 2014.
Search Report for PCT/US2014/022307, mailed Jun. 10, 2014.
Shaw LFG Specialties, LCC "Waste Heat Leachate Evaporator System" (2011).
Shaw LFG Specialties, LLC, 2006 Product Catalog.
Shimizu et al., "Filtration Characteristics Of Hollow Fiber Microfiltration Membranes Used In Membrane Bioreactor For Domestic Wastewater Treatment," *Wat. Res.*, 30(10):2385-2392 (1996).
Smith, "Sludge-U-Like, As The Ban On Sea Disposal Of Sewage Waste Looms, Technologies That Can Deliver Cleaner, Thicker And More Farmer-Friendly Sludges Are Gaining Popularity," *Water Bulletin*, 708 (1996).
St. Onge et al., "Start-Up, Testing, And Performance Of The First Bulb-Type Hydroelectric Project In The U.S.A.," *IEEE Transactions on Power Apparatus Systems*, PAS-101(6):1313-1321 (1982).
Supplementary European Search Report for U.S. Appl. No. 13/820,641, dated Jun. 6, 2016.
Supplementary Partial European Search Report for Application No. EP13820641.2, dated Feb. 11, 2016.
Swaminathan et al., "Some Aerodynamic Aspects Of Spouted Beds Of Grains," Department of Chemical Engineering, McGill University, Montreal, Quebec, Canada, pp. 197-204 (2007).
Talbert et al., "The Elecrospouted Bed," *IEEE Transactions on Industry Applications*, vol. 1A-20, No. 5, pp. 1220-1223 (1984).
U.S. Office Action for U.S. Appl. No. 12/530,484, dated Apr. 16, 2013.
U.S. Office Action for U.S. Appl. No. 12/846,337, dated Apr. 17, 2013.
U.S. Appl. No. 13/849,274, filed Mar. 22, 2013.
Williams et al., "Aspects Of Submerged Combustion As A Heat Exchange Method," *Trans IChemE*, 71(A):308-309 (1993).
Written Opinion for Application No. PCT/US2010/024143, dated Oct. 12, 2010.
Written Opinion for Application No. PCT/US2012/021897, dated Sep. 28, 2012.
Written Opinion for International application No. PCT/US2014/063818, mailed Feb. 25, 2015.
Written Opinion for International application No. PCT/US2016/029434, mailed Oct. 4, 2016.
Written Opinion for PCT/US2014/015007, mailed Nov. 12, 2014.
Written Opinion for PCT/US2014/022307, mailed Jun. 10, 2014.
Ye et al., "Removal And Distribution Of Iron, Manganese, Cobalt, And Nickel Within A Pennsylvania Constructed Wetland Treating Coal Combustion By-Product Leachate," *J. Environ. Qual.*, 30:1464-1473 (2001).
Yeh et al., "Double-Pass Heat Or Mass Transfer Through A Parallel-Plate Channel with Recycle," *International Journal of Hat and Mass Transfer*, 43:487-491 (2000).
Yoshino et al., "Removal and Recovery of Phosphate and Ammonium as Struvite from Supernatant in Anaerobic Digestion," *Water Science and Technology*, 48(1):171-178 (2003).
International Search Report and Written Opinion for Application No. PCT/US2020/035240, dated Oct. 5, 2020.
U.S. Office Action for U.S. Appl. No. 16/888,186 dated Dec. 22, 2021.
U.S. Office Action for U.S. Appl. No. 16/888,186 dated Nov. 14, 2022.
U.S. Office Action for U.S. Appl. No. 16/888,186 dated Apr. 8, 2021.

* cited by examiner

HARMFUL SUBSTANCE REMOVAL SYSTEM AND METHOD

FIELD OF THE DISCLOSURE

This application relates generally to liquid concentrators, and more specifically to compact, portable, inexpensive wastewater concentrators that remove harmful substances from waste water streams.

BACKGROUND

Per- and polyfluoroalkyl substances (PFAS) are commonly used in a wide range of consumer products, such as non-stick cooking pans, due to the oil and water repellant properties of these substances, as well as good thermal resistance and friction reduction. Other consumer products, such as textiles, paper products, and furniture make use of protective sprays that use these substances. Because these consumer products are regularly replaced, the worn out products usually end up in a landfill where the PFAS is eventually released and congregates in the landfill leachate.

Recent studies have found that PFAS may be harmful to humans and animals in small quantities if ingested. As a result, many government agencies are beginning to draft regulations directed towards mitigating PFAS in landfills so that the PFAS does not eventually seep into local drinking water.

Currently there are no known solutions that remove PFAS in wastewater concentrators or evaporators.

SUMMARY

According to a first embodiment, a harmful substance removal system includes a direct contact liquid concentrator having a gas inlet, a gas outlet, a mixing chamber disposed between the gas inlet and the gas outlet, and a liquid inlet for importing liquid into the mixing chamber. Gas and liquid mixing in the are mixed chamber and a portion of the liquid is vaporized. A demister is disposed downstream of the mixing chamber. The demister includes at least one stage of mist elimination having a first filter that removes particles greater than 9 microns. A fan is coupled to the demister to assist gas flow through the mixing chamber.

According to a second embodiment, a method of moving PFAS from a liquid includes providing a source of heat. Heat is moved through a direct contact liquid concentrator. The direct contact liquid concentrator includes a heat inlet, a heat outlet, a liquid inlet, and a mixing chamber connecting the heat inlet and the heat outlet. Liquid is injected into the mixing chamber through the liquid inlet. Heat and the liquid are mixed and energy in the heat at least partially evaporates the liquid. Entrained liquid droplets greater than 9 microns in size are removed.

The foregoing embodiments may further include any one or more of the following optional features, structures, and/or forms.

In one optional form, the filter is located downstream of the fan.

In another optional form, a second filter is disposed in the demister, the second filter removing particles greater than 15 microns, the second filter being located upstream of the first filter.

In other optional forms, a third filter is disposed in the demister, the third filter being a coarse filter, the third filter being located upstream of the second filter.

In other optional forms, the first filter removes particles greater than 5 microns and preferably greater than 1 micron.

In other optional forms, a vapor condenser is included.

In other optional forms, a selective reduction catalyst treatment system is included.

In other optional forms, the first filter comprises one of a mesh pad, a mesh pad and chevron, a chevron, a flat pad, or a cylindrical pad.

In other optional forms, the demister includes a wash system that sprays cleaning water on the first filter.

In other optional forms, the cleaning water comprises one of service water, treated water, or wastewater.

In other optional forms, the liquid comprises one of landfill leachate, power plant leachate, and military wastewater.

In other optional forms, a PFAS binding system is applied to the evaporation system or to the residual material after evaporation.

In other optional forms, the PFAS binding system includes an injection mechanism for injecting an adsorbent, such as granular activated carbon.

In other optional forms, the harmful substance is a polyfluoroalkyl substance (PFAS).

In other optional forms, the first filter is removable.

In other optional forms, a re-circulating circuit is disposed between reservoir and the mixing corridor to transport liquid within the reservoir to the mixing corridor.

In other optional forms, the re-circulating circuit is coupled to the liquid inlet of the concentrator section.

In other optional forms, a baffle is disposed in the mixing corridor adjacent to the further liquid inlet so that the concentrated liquid from the re-circulating circuit impinges on the baffle and disperses into the mixing corridor in small droplets.

In other optional forms, an adjustable flow restriction is included in the mixing corridor.

In other optional forms, the fan is an induction fan located downstream of the demister to provide a negative pressure gradient through the demister.

In other optional forms, a sprayer is disposed within the demister, the sprayer being positioned to spray liquid on the first filter to clean the first filter.

In other optional forms, a thermal destruction system is included.

In other optional forms, the thermal destruction system is a vapor thermal destruction system located downstream of the demister.

In other optional forms, a condenser is located upstream of the thermal destruction system.

In other optional forms, the thermal destruction system is a liquid thermal destruction system that is used on the concentrated liquid portion of the leachate.

In other optional forms, a second volume reduction step is included, for example, an evaporator, a sludge dryer, or a centrifuge followed by thermal destruction of the residual material from the second volume reduction step.

In other optional forms, the thermal destruction device is an incinerator fueled by natural gas, landfill gas, or propane.

In other optional forms, the system includes a vessel having an interior adapted to receive a contaminated liquid, and a tube disposed within the vessel and adapted to transport a gas into the interior of the vessel.

In other optional forms, a baffle is disposed above a fluid in the vessel.

In other optional forms, the baffle is attached to the tube.

In other optional forms, the baffle is attached to an interior wall of the vessel.

In other optional forms, the tube includes a gas exit disposed below a surface of the process fluid within the vessel.

In other optional forms, the gas is forced into the vessel with a blower.

In other optional forms, the first filter removes particles greater than 0.5 microns.

DETAILED DESCRIPTION

The PFAS removal systems and methods described herein may be used in direct contact liquid concentrators and/or evaporators, such as the liquid concentrator disclosed in U.S. Pat. No. 8,568,557, and the submerged gas evaporator disclosed in U.S. Pat. No. 8,382,075, each of which is hereby incorporated by reference herein.

A number of governmental agencies have started to regulate certain PFAS (PFOA, PFOS and others) in drinking water. To meet the new regulations, water treatment plants are required to limit the amount of PFAS that can be discharged to the water going to a treatment plant. One significant source of PFAS is landfill leachate. PFAS in trash make their way into the leachate. Most landfill leachate ends up at wastewater treatment plants.

Currently, some landfills evaporate some of the liquid portion of landfill leachate before sending the concentrated leachate to a water treatment plant to reduce costs. The wastewater concentrators identified in the U.S. Patents above are sometimes used to evaporate a portion of landfill leachate. If possible, keeping PFAS in the landfill may be an important advantage for a landfill and possibly a requirement, because water treatment plants may refuse to accept leachate having PFAS or other contaminates.

In a leachate evaporation process, such as the processes described above and below, there are two places PFAS can end up: one is in the vapor stream leaving the concentrator and the other in the concentrated residual liquid. Currently, the total amount of PFAS in leachate is a very, very small quantity, about 2 lb/yr for an average landfill. Measurement of PFAS is typically reported in the parts per trillion range.

PFAS in the vapor stream of a concentrator is not desirable since PFAS may be deposited in places that might contact water and find its way to drinking water. PFAS can enter the vapor stream in the following ways. First, PFAS in Vapor Phase (gas phase)—Vapor phase PFAS will be very small. Chemical properties of PFAS (vapor pressure, pH range of leachate) are such that very, very little should transfer to the vapor phase. However, there are thousands of different PFAS compounds and only a few have published detail chemical properties, so proving low vapor phase for all PFAS based on chemical properties is not possible. PFAS traveling with particles in vapor stream—solid PFAS particles may bind to entrained liquid particles and travel with the vapor stream. PFAS traveling in mist—PFAS is expected to be in ionic form in leachate residual. PFAS may be emitted with vapor as a mist. Current concentrator systems remove large articles (e.g., greater than 50 microns) from a vapor stream that may contain PFAS but generally do not remove small particles, typically less than 10 microns.

PFAS that does not make it to the vapor steam of a concentrator ends up in the residual concentrate, which is desirable because the residual may be returned to the landfill and not sent to the water treatment facility. However, eventually PFAS returned to the landfill in the residual liquid may begin to cycle up and eventually reach higher levels. If landfill leachate reaches a concentration of PFAS that is unacceptable, the PFAS may be removed through thermal destruction in which the PFAS in liquid form is taken offsite to an incinerator or an incinerator could be placed in the landfill. Incineration is an expensive option but should address any/all concerns. Alternatively, the PFAS may be stabilized. Stabilized PFAS containing sludges are mixed with an adsorbent, such as granular activated carbon, that ties up or binds some/all PFAS in the liquid.

Figure 1:
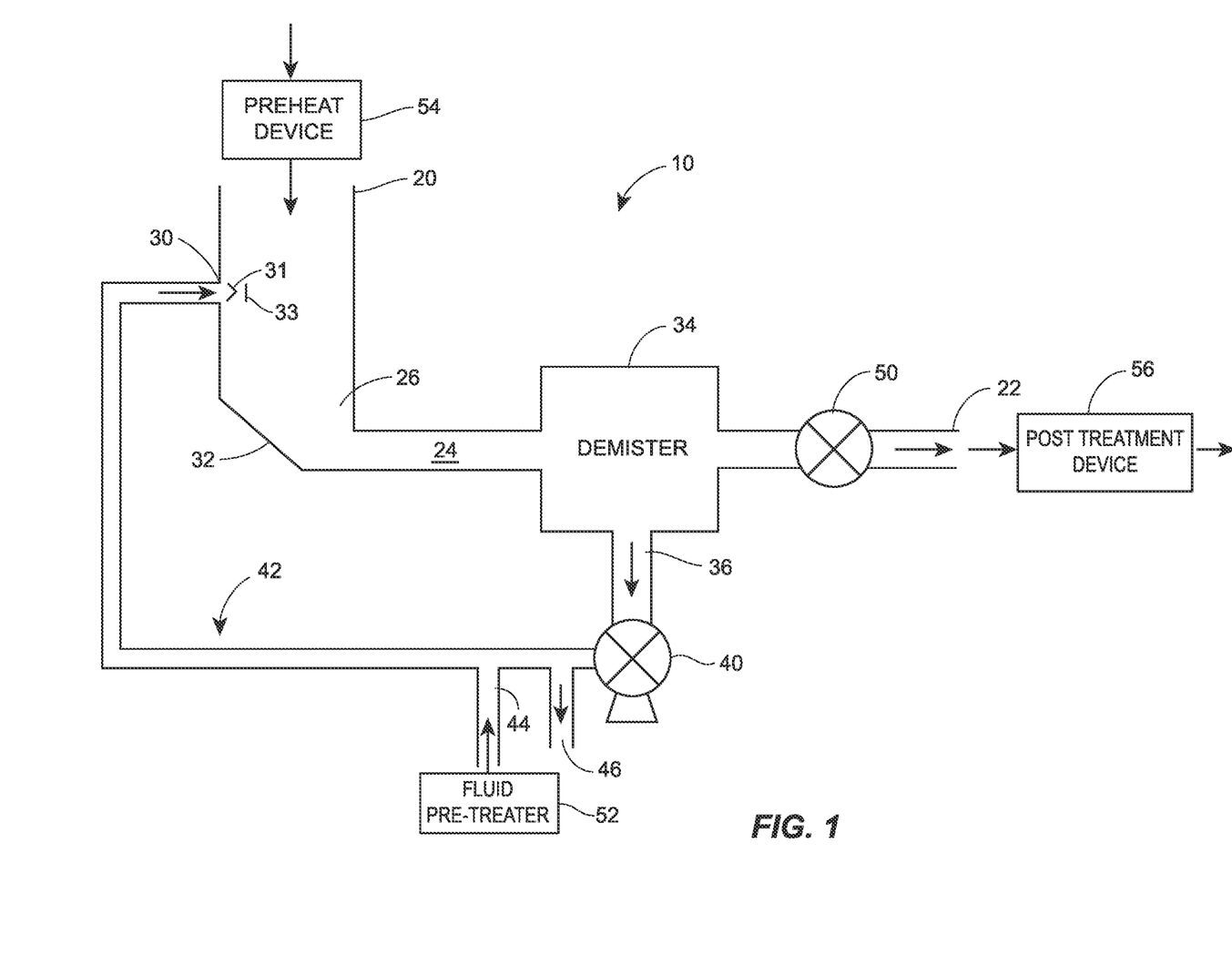
FIG. 1 is a general schematic diagram of a compact liquid concentrator that is used to concentrate landfill leachate.

Tuning now to FIG. 1, a generalized schematic diagram of a liquid concentrator 10 is illustrated that includes a gas inlet 20, a gas exit 22 and a flow corridor 24 connecting the gas inlet 20 to the gas exit 22. The flow corridor 24 includes a narrowed portion 26 that accelerates the flow of gas through the flow corridor 24 creating turbulent flow within the flow corridor 24 at or near this location. The narrowed portion 26 in this embodiment may formed by a venturi device. In other concentrators, the flow corridor 24 may not include a narrowed portion. A liquid inlet 30 injects a liquid to be concentrated (via evaporation) into a liquid concentration chamber in the flow corridor 24 at a point upstream of the narrowed portion 26, and the injected liquid joins with the gas flow in the flow corridor 24. The liquid inlet 30 may include one or more replaceable nozzles 31 for spraying the liquid into the flow corridor 24. The inlet 30, whether or not equipped with a nozzle 31, may introduce the liquid in any direction from perpendicular to parallel to the gas flow as the gas moves through the flow corridor 24. A baffle 33 may also be located near the liquid inlet 30 such that liquid introduced from the liquid inlet 30 impinges on the baffle and disperses into the flow corridor in small droplets.

As the gas and liquid flow through the narrowed portion 26, the venturi principle creates an accelerated and turbulent flow that thoroughly mixes the gas and liquid in the flow corridor 24 at and after the location of the inlet 30. As a result of the turbulent mixing, a portion of the liquid rapidly vaporizes and becomes part of the gas stream. As the gas-liquid mixture moves through the narrowed portion 26, the direction and/or velocity of the gas/liquid mixture may be changed by an adjustable flow restriction, such as a venturi plate 32, which is generally used to create a large pressure difference in the flow corridor 24 upstream and downstream of the venturi plate 32. The venturi plate 32 may be adjustable to control the size and/or shape of the narrowed portion 26 and may be manufactured from a corrosion resistant material including a high alloy metal such as those manufactured under the trade names of Hastelloy®, Inconel®, AL6XN, and Monel®.

After leaving the narrowed portion 26, the gas-liquid mixture passes through a demister 34 (also referred to as a fluid scrubber) coupled to the gas exit 22. The demister 34 removes entrained liquid droplets from the gas stream. The demister 34 includes a gas-flow passage. The removed liquid collects in a liquid collector or sump 36 in the gas-flow passage, the sump 36 may also include a reservoir for holding the removed liquid. A pump 40 fluidly coupled to the sump 36 and/or reservoir moves the liquid through a re-circulating circuit 42 back to the liquid inlet 30 and/or flow corridor 24. In this manner, the liquid may be reduced through evaporation to a desired concentration. Fresh or new liquid to be concentrated is input to the re-circulating circuit 42 through a liquid inlet 44. This new liquid may instead be injected directly into the flow corridor 24 upstream of the venturi plate 32. The rate of fresh liquid input into the re-circulating circuit 42 may be equal to the rate of evaporation of the liquid as the gas-liquid mixture flows through the flow corridor 24 plus the rate of liquid extracted through a concentrated fluid extraction port 46 located in or near the reservoir in the sump 40. The ratio of re-circulated liquid to fresh liquid may generally be in the range of approximately 1:1 to approximately 100:1, and is usually in the range of approximately 5:1 to approximately 25:1. For example, if the re-circulating circuit 42 circulates fluid at approximately 10 gal/min, fresh or new liquid may be introduced at a rate of approximately 1 gal/min (i.e., a 10:1 ratio). A portion of the liquid may be drawn off through the extraction port 46 when the liquid in the re-circulating circuit 42 reaches a desired concentration.

After passing through the demister 34 the gas stream passes through an induction fan 50 that draws the gas through the flow corridor 24 and demister gas-flow corridor under negative pressure. Of course, the concentrator 10 could operate under positive pressure produced by a blower (not shown) prior to the liquid inlet 30. Finally, the gas is vented to the atmosphere or directed for further processing through the gas exit 22.

The concentrator 10 may include a pre-treatment system 52 for treating the liquid to be concentrated, which may be a wastewater feed. For example, an air stripper may be used as a pre-treatment system 52 to remove substances that may produce foul odors or be regulated as air pollutants. In this case, the air stripper may be any conventional type of air stripper or may be a further concentrator of the type described herein, which may be used in series as the air stripper. The pre-treatment system 52 may, if desired, heat the liquid to be concentrated using any desired heating technique. Additionally, the gas and/or wastewater feed circulating through the concentrator 10 may be pre-heated in a pre-heater 54. Pre-heating may be used to enhance the rate of evaporation and thus the rate of concentration of the liquid. The gas and/or wastewater feed may be pre-heated through combustion of renewable fuels such as wood chips, bio-gas, methane, or any other type of renewable fuel or any combination of renewable fuels, fossil fuels and waste heat. Furthermore, the gas and/or wastewater may be pre-heated through the use of waste heat generated in a landfill flare or stack. Also, waste heat from an engine, such as an internal combustion engine, may be used to pre-heat the gas and/or wastewater feed. Additionally, the gas streams ejected from the gas exit 22 of the concentrator 10 may be transferred into a flare or other post treatment device 56 which treats the gas before releasing the gas to the atmosphere. More specifically, the post treatment device 56 may be a thermal destruction device or a PFAS binding system. In other embodiments, the post treatment device 56 may be preceded by a condenser that condenses water vapor in the exhaust gas. In yet other embodiments, the post treatment device may include a thermal destruction device for the residual wastewater.

The liquid concentrator 10 described herein may be used to concentrate a wide variety of wastewater streams, such as waste water from industry, runoff water from natural disasters (floods, hurricanes), refinery caustic, leachate such as landfill leachate, etc. The liquid concentrator 10 is practical, energy efficient, reliable, and cost-effective. In order to increase the utility of this liquid concentrator, the liquid concentrator 10 is readily adaptable to being mounted on a trailer or a moveable skid to effectively deal with wastewater streams that arise as the result of accidents or natural disasters or to routinely treat wastewater that is generated at spatially separated or remote sites. The liquid concentrator 10 described herein has all of these desirable characteristics and provides significant advantages over conventional wastewater concentrators, especially when the goal is to manage a broad variety of wastewater streams.

Moreover, the concentrator 10 may be largely fabricated from highly corrosion resistant, yet low cost materials such as fiberglass and/or other engineered plastics. This is due, in part, to the fact that the disclosed concentrator is designed to operate under minimal differential pressure. For example, a differential pressure generally in the range of only 10 to 30 inches water column is required. Also, because the gas-liquid contact zones of the concentration processes generate high turbulence within narrowed (compact) passages at or directly after the venturi section of the flow path, the overall design is very compact as compared to conventional concentrators where the gas liquid contact occurs in large process vessels. As a result, the amount of high alloy metals required for the concentrator 10 is quite minimal. Also, because these high alloy parts are small and can be readily replaced in a short period of time with minimal labor, fabrication costs may be cut to an even higher degree by designing some or all of these parts to be wear items manufactured from lesser quality alloys that are to be replaced at periodic intervals. If desired, these lesser quality alloys (e.g., carbon steel) may be coated with corrosion and/or erosion resistant liners, such as engineered plastics including elastomeric polymers, to extend the useful life of such components. Likewise, the pump 40 may be provided with corrosion and/or erosion resistant liners to extend the life of the pump 40, thus further reducing maintenance and replacement costs.

As will be understood, the liquid concentrator 10 provides direct contact of the liquid to be concentrated and the hot gas, effecting highly turbulent heat exchange and mass transfer between hot gas and the liquid, e.g., wastewater, undergoing concentration. Moreover, the concentrator 10 employs highly compact gas-liquid contact zones, making it minimal in size as compared to known concentrators. The direct contact heat exchange feature promotes high energy efficiency and eliminates the need for solid surface heat exchangers as used in conventional, indirect heat transfer concentrators. Further, the compact gas-liquid contact zone eliminates the bulky process vessels used in both conventional indirect and direct heat exchange concentrators. These features allow the concentrator 10 to be manufactured using comparatively low cost fabrication techniques and with reduced weight as compared to conventional concentrators. Both of these factors favor portability and cost-effectiveness. Thus, the liquid concentrator 10 is more compact and lighter in weight than conventional concentrators, which make it ideal for use as a portable unit. Additionally, the liquid concentrator 10 is less prone to fouling and blockages due to the direct contact heat exchange operation and the lack of solid heat exchanger surfaces. The liquid concentrator 10 can also process liquids with significant amounts of suspended solids because of the direct contact heat exchange. As a result, high levels of concentration of the process fluids may be achieved without need for frequent cleaning of the concentrator 10.

More specifically, in liquid concentrators that employ indirect heat transfer, the heat exchangers are prone to fouling and are subject to accelerated effects of corrosion at the normal operating temperatures of the hot heat transfer medium that is circulated within them (steam or other hot fluid). Each of these factors places significant limits on the durability and/or costs of building conventional indirectly heated concentrators, and on how long they may be operated before it is necessary to shutdown and clean or repair the heat exchangers. By eliminating the bulky process vessels, the weight of the liquid concentrators and both the initial costs and the replacement costs for high alloy components are greatly reduced. Moreover, due to the temperature difference between the gas and liquid, the relatively small volume of liquid contained within the system, and the reduced relative humidity of the gas prior to mixing with the liquid, the concentrator 10 operates at close to the adiabatic saturation temperature for the particular gas/liquid mixture, which is typically in the range of about 150 degrees Fahrenheit to about 215 degrees Fahrenheit (i.e., this concentrator is a "low momentum" concentrator).

Moreover, the concentrator 10 is designed to operate under negative pressure, a feature that greatly enhances the ability to use a very broad range of fuel or waste heat sources as an energy source to affect evaporation. In fact, due to the draft nature of these systems, pressurized or non-pressurized burners may be used to heat and supply the gas used in the concentrator 10. Further, the simplicity and reliability of the concentrator 10 is enhanced by the minimal number of moving parts and wear parts that are required. In general, only two pumps and a single induced draft fan are required for the concentrator when it is configured to operate on waste heat such as stack gases from engines (e.g., generators or vehicle engines), industrial process stacks, gas compressor systems, and flares, such as landfill gas flares. These features provide significant advantages that reflect favorably on the versatility and the costs of buying, operating and maintaining the concentrator 10.

A typical concentrator 10 may be capable of treating as much as one-hundred thousand gallons or more per day of wastewater, while larger, stationary units, such as those installed at landfills, sewage treatment plants, or natural gas or oil fields, may be capable of treating multiples of one-hundred thousand gallons of wastewater per day.

Figure 2:
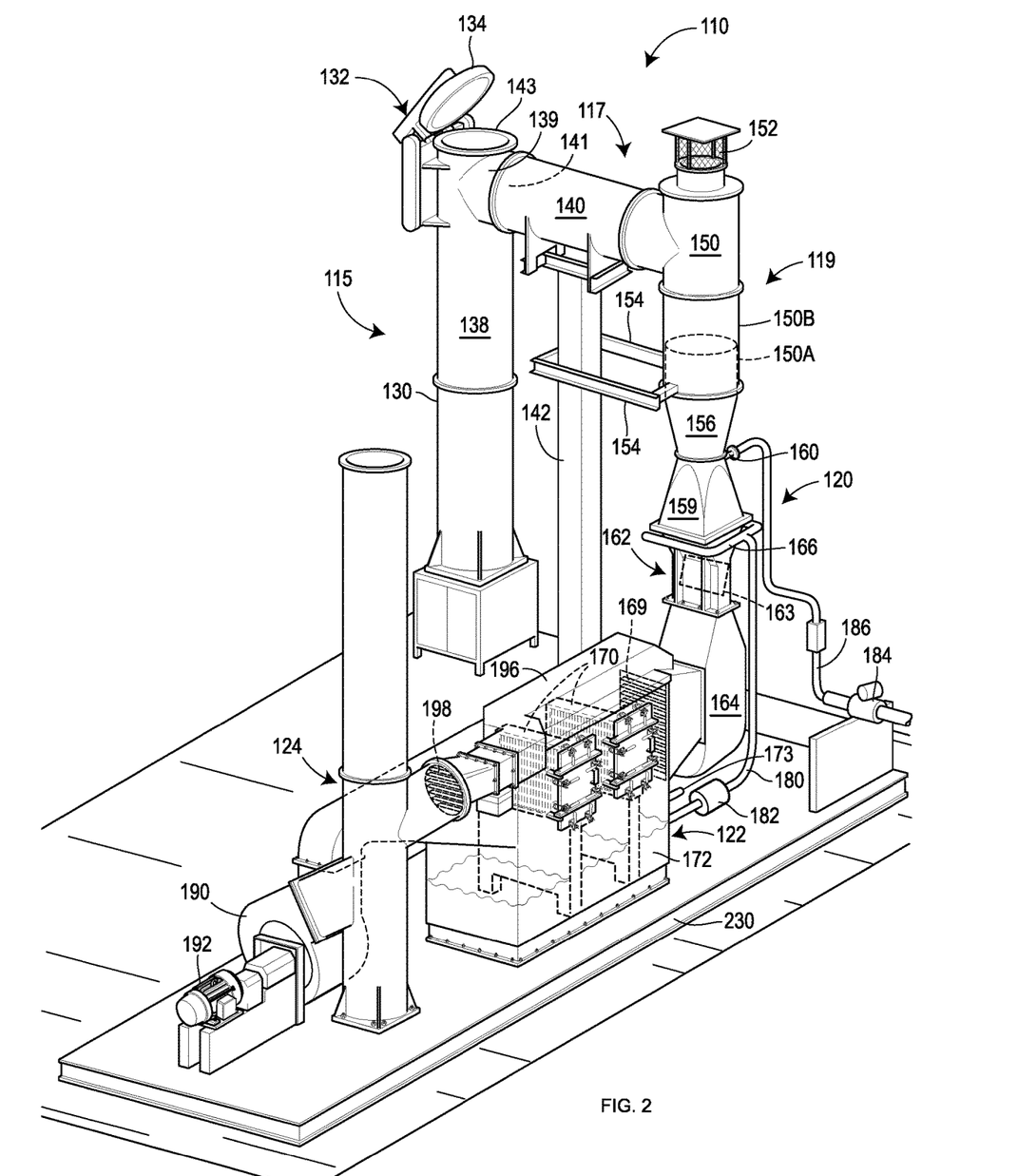
FIG. 2 is a perspective view of a compact liquid concentrator which implements the concentration process illustrated in FIG. 1, and which may be used to mitigate PFAS.

Turning now to FIG. 2, an embodiment of the compact liquid concentrator 110 operates to concentrate wastewater, such as landfill leachate, using exhaust or waste heat. For example, many landfills include a flare which is used to burn landfill gas to eliminate methane and other gases prior to release to the atmosphere. Typically, the gas exiting the flare is between 1000 and 1500 degrees Fahrenheit and may reach 1800 degrees Fahrenheit.

As illustrated in FIG. 2, the compact liquid concentrator 110 generally includes or is connected to a flare assembly 115, and includes a heat transfer assembly 117 (shown in more detail in FIG. 4), an air pre-treatment assembly 119, a concentrator assembly 120 (shown in more detail in FIG. 5), a fluid scrubber 122, and an exhaust section 124. Importantly, the flare assembly 115 includes a flare 130, which burns landfill gas therein according to any known principles, and an optional flare cap assembly 132. The flare cap assembly 132 includes a moveable cap 134 (e.g., a flare cap, an exhaust gas cap, etc.) which covers the top of the flare 130, or other type of stack (e.g., a combustion gas exhaust stack), to seal off the top of the flare 130 when the flare cap 134 is in the closed position, or to divert a portion of the flare gas in a partially closed position, and which allows gas produced within the flare 130 to escape to the atmosphere through an open end that forms a primary gas outlet 143, when the flare cap 134 is in an open or partially open position. The flare cap assembly 132 also includes a cap actuator 135, such as a motor (e.g., an electric motor, a hydraulic motor, a pneumatic motor, etc.) which moves the flare cap 134 between the fully open and the fully closed positions.

If desired, the flare 130 may include an adapter section 138 including the primary combustion gas outlet 143 and a secondary combustion gas outlet 141 upstream of the primary combustion gas outlet 143. When the flare cap 130 is in the closed position, combustion gas is diverted through the secondary combustion gas outlet 141. The adapter section 138 may include a connector section 139 that connects the flare 130 (or exhaust stack) to the heat transfer section 117 using a 90 degree elbow or turn. Other connector arrangements are possible. For example, the flare 130 and heat transfer section 117 may be connected at virtually any angle between 0 degrees and 180 degrees. In this case, the flare cap assembly 132 is mounted on the top of the adaptor section 138 proximate the primary combustion gas outlet 143.

As illustrated in FIG. 2, the heat transfer assembly 117 includes a transfer pipe 140, which connects to an inlet of the air pre-treatment assembly 119 to the flare 130 and, more particularly, to the adaptor section 138 of the flare 130. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe forming a portion of a fluid passageway between the adapter section 138 and a secondary process, such as a fluid concentrating process. The support member 142 is typically necessary because the heat transfer pipe 140 will generally be made of metal, such as carbon or stainless steel, and may be refractory lined with materials such as aluminum oxide and/or zirconium oxide, to withstand the temperature of the gas being transferred from the flare 130 to the air pre-treatment assembly 119. Thus, the heat transfer pipe 140 will typically be a heavy piece of equipment. However, because the flare 130, on the one hand, and the air pre-treatment assembly 119 and the concentrator assembly 120, on the other hand, are disposed immediately adjacent to one another, the heat transfer pipe 140 generally only needs to be of a relatively short length, thereby reducing the cost of the materials used in the concentrator 110, as well as reducing the amount of support structure needed to bear the weight of the heavy parts of the concentrator 110 above the ground. As illustrated in FIG. 2, the heat transfer pipe 140 and the air pre-treatment assembly 1119 form an upside-down U-shaped structure.

The air pre-treatment assembly 119 includes a vertical piping section 150 and an ambient air valve disposed at the top of the vertical piping section 150. The ambient air valve (also referred to as a bleed valve) forms a fluid passageway between the heat transfer pipe 140 (or air pre-treatment assembly 119) and the atmosphere. The ambient air valve operates to allow ambient air to flow through a mesh bird screen 152 (typically wire or metal) and into the interior of the air pre-treatment assembly 119 to mix with the hot gas coming from the flare 130. If desired, the air pre-treatment assembly 119 may include a permanently open section proximate to the bleed valve which always allows some amount of bleed air into the air pre-treatment assembly 119, which may be desirable to reduce the size of the required bleed valve and for safety reasons. While the control of the ambient air or bleed valve will be discussed in greater detail hereinafter, this valve generally allows the gas from the flare 130 to be cooled to a more useable temperature before entering into the concentrator assembly 120. The air pre-treatment assembly 119 may be supported in part by cross-members 154 connected to the support member 142. The cross-members 154 stabilize the air pre-treatment assembly 119, which is also typically made of heavy carbon or stainless steel or other metal, and which may be refractory-lined to improve energy efficiency and to withstand the high temperature of the gases within this section of the concentrator 110. If desired, the vertical piping section 150 may be extendable to adapt to or account for flares of differing heights so as to make the liquid concentrator 110 easily adaptable to many different flares or to flares of different heights. This concept is illustrated in more detail in FIG. 2. As shown in FIG. 2, the vertical piping section 150 may include a first section 150A (shown using dotted lines) that rides inside of a second section 150B thereby allowing the vertical piping section 150 to be adjustable in length (height).

Generally speaking, the air pre-treatment assembly 119 operates to mix ambient air provided through the ambient air valve beneath the screen 152 and the hot gas flowing from the flare 130 through the heat transfer pipe 140 to create a desired temperature of gas at the inlet of the concentrator assembly 120.

The liquid concentrator assembly 120 includes a lead-in section 156 having a reduced cross-section at the top end thereof which mates the bottom of the piping section 150 to a quencher 159 of the concentrator assembly 120. The concentrator assembly 120 also includes a first fluid inlet 160, which injects new or untreated liquid to be concentrated, such as landfill leachate, into the interior of the quencher 159. While not shown in FIG. 2, the inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer is a coarse sprayer, the sprayer nozzle is not subject to fouling or being clogged by the small particles within the liquid. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, but not specifically shown in FIG. 2, a temperature sensor may be located at or near the exit of the piping section 150 or in the quencher 159 and may be used to control the position of the ambient air valve to thereby control the temperature of the gas present at the inlet of the concentrator assembly 120.

As shown in FIG. 2, the quencher 159 is connected to liquid injection chamber which is connected to narrowed portion or venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod connected to the pivot point of the plate 163, or via an electric control mechanism, such as motor.

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. While not explicitly shown in FIG. 2, a number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ inch pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the liquid within the gas. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit.

The bottom of the flooded elbow 164 has liquid disposed therein, and the gas-liquid mixture exiting the venturi section 162 at high rates of speed impinges on the liquid in the bottom of the flooded elbow 164 as the gas-liquid mixture is forced to turn 90 degrees to flow into the fluid scrubber 122. The interaction of the gas-liquid stream with the liquid within the flooded elbow 164 removes liquid droplets from the gas-liquid stream and prevents suspended particles within the gas-liquid stream from hitting the bottom of flooded elbow 164 at high rates of speeds, thereby preventing erosion of the metal wall of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters 169, 170 which aid in removal of entrained liquids from the gas-liquid stream and removes other particles that might be present with the gas-liquid stream.

As is typical in cross flow scrubbers, liquid captured by the filters 169 and 170 gravity drains into a reservoir or sump 172 located at the bottom of the fluid scrubber 122. The sump 172, which may hold, for example 200 gallons of liquid or more, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120. In one embodiment, the sump 172 may include a sloped V-shaped bottom (not shown in the drawings) having a V-shaped groove extending from the back of the fluid scrubber 122 (furthest away from the flooded elbow 164) to the front of the fluid scrubber 122 (closest to the flooded elbow 164), wherein the V-shaped groove is sloped such that the bottom of the V-shaped groove is lower at the end of the fluid scrubber 122 nearest the flooded elbow 164 than at an end farther away from the flooded elbow 164. In other words, the V-shaped bottom may be sloped with the lowest point of the V-shaped bottom proximate the exit port 173 and/or the pump 182. Additionally, a washing circuit (not shown in the drawings) may pump concentrated fluid from the sump 172 to a sprayer (not shown) within the cross flow scrubber 122, the sprayer being aimed to spray liquid at the V-shaped bottom. Alternatively, the sprayer may spray unconcentrated liquid or clean water at the V-shaped bottom and/or on the chevrons 170. The sprayer may periodically or constantly spray liquid onto the surface of the V-shaped bottom to wash solids and prevent solids buildup on the V-shaped bottom or at the exit port 173 and/or the pump 182. As a result of this V-shaped sloped bottom and pump, liquid collecting in the sump 172 is continuously agitated and renewed, thereby maintaining a relatively constant consistency and maintaining solids in suspension. If desired, the spraying circuit may be a separate circuit using a separate pump with, for example, an inlet inside of the sump 173, or may use a pump 182 associated with a concentrated liquid re-circulating circuit described below to spray concentrated fluid from the sump onto the V-shaped bottom of the sump 172. In some cases, the sprayer may incorporate the use of anti-foam agents or foam suppressors.

As illustrated in FIG. 2, a return line 180, as well as a pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as landfill leachate, to the input 160 of the concentrator assembly 120. Also, one or more sprayers 185 may be disposed inside the fluid scrubber 122 adjacent the chevrons 170 and may be operated periodically to spray clean water or a portion of the wastewater feed on the chevrons 170 to keep them clean. A chevron 170 is a type of filter, and other types of filters may be substituted for the chevrons 170 illustrated in the drawings.

Concentrated liquid also be removed from the bottom of the fluid scrubber 122 via the exit port 173 and may be further processed or disposed of in any suitable manner in a secondary re-circulating circuit. In particular, the concentrated liquid removed by the exit port 173 contains a certain amount of suspended solids, which preferably may be separated from the liquid portion of the concentrated liquid and removed from the system using a secondary re-circulating circuit. For example, concentrated liquid removed from the exit port 173 may be transported through a secondary concentrated wastewater circuit (not shown) to a solid/liquid separating device, such as a settling tank, a vibrating screen, a rotary vacuum filter, a filter press, or a centrifuge. After the suspended solids and liquid portion of the concentrated wastewater are separated by the solid/liquid separating device, the liquid portion of the concentrated wastewater may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120. As described above with respect to FIG. 1, the induced draft fan 190 needs only to provide a slight negative pressure within the fluid scrubber 122 to assure proper operation of the concentrator 110.

Figure 3:
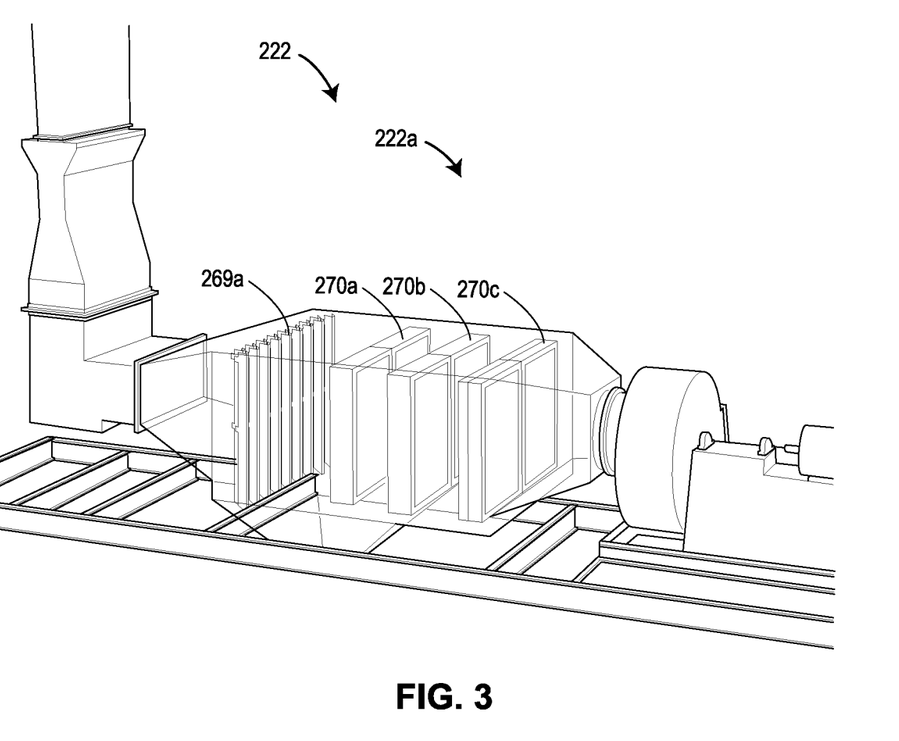
FIG. 3 is a side view of a portion of the compact liquid concentrator of FIG. 2, including a PFAS removal scrubber.

Turning now to FIG. 3, a fluid scrubber 222 is illustrated that includes a harmful substance removal assembly 222a in the form of a series of filters or screens 269a, 270a, 270b, 270c. More specifically, the filter 269a is a coarse filter as described above. Filters 270a, and 270b are fine filters as described above, and the addition of an ultra fine filter 270c captures droplets having diameters of less than 9 microns, preferably less than 5 microns, and more preferably less than 1 micron, and even more preferably less than 0.5 microns. Filtering dropets of these sizes has been found to be very effective at removing PFAS from the system. The filters 269a, 270a, 270b, 270c may be removable from the fluid scrubber 222. The fluid scrubber 222 illustrated in FIG. 3 may replace the fluid scrubber 122 of FIG. 2, or the fluid scrubber 22 of FIG. 1. Moreover, the fluid scrubber 222 of FIG. 3 may be used to replace any filter and or fluid scrubber in a SGE type concentrator. In other embodiments, the ultra fine filter 270c may be located downstream of the induction fan, in the exhaust stack. Filters are considered to remove 99% of particles of the stated size for the filter. For example, a 5 micron filter removes 99% of particles greater than 5 microns.

Figure 4:
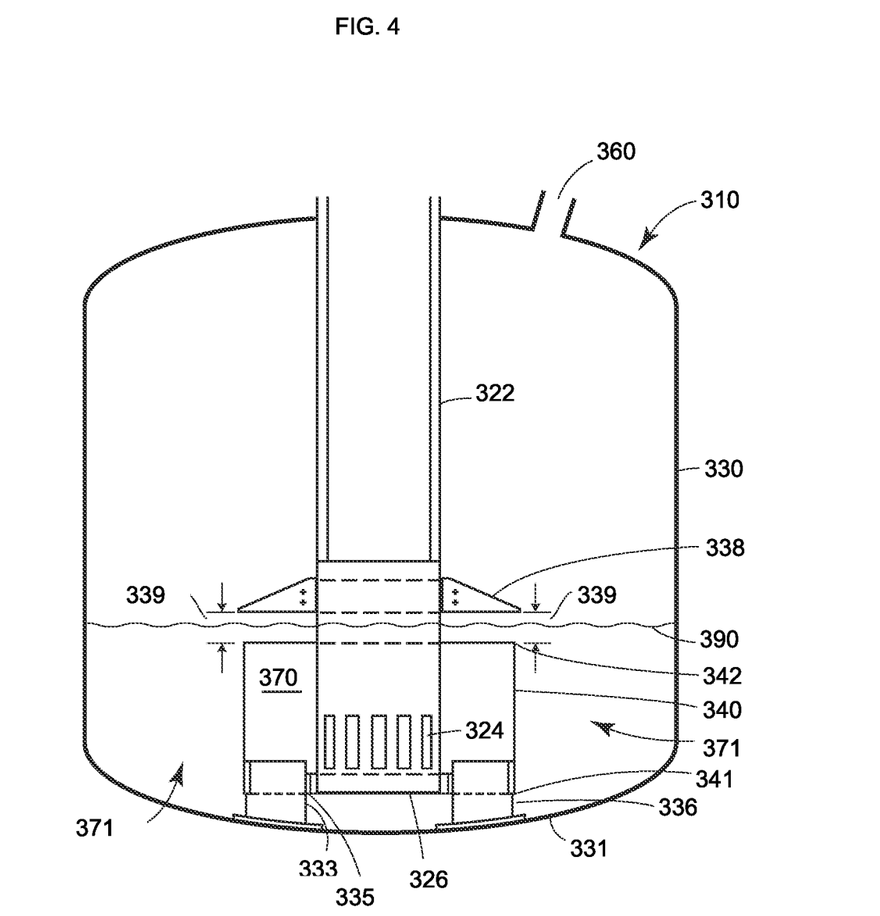
FIG. 4 is a schematic view of an alternative embodiment of a compact liquid concentrator that may be used in combination with the PFAS removal scrubber of FIG. 3.

Turning now to FIG. 4, an alternative compact liquid concentrator 310 is described that may be used with the fluid scrubber 222 of FIG. 3. The compact liquid concentrator 310 includes a vessel 330 having an interior adapted to receive a contaminated liquid. A weir 340 that extends around a gas inlet tube 322. The compact liquid concentrator 310 in this example may be a submerged gas evaporator, a submerged gas reactor or a combination submerged gas evaporator/reactor. A blower device (not shown in FIG. 3) delivers heated gas to the gas inlet tube 322. The vessel 330 has a dished bottom and an interior volume. The gas inlet tube 322 is at least partially disposed within the interior volume of the vessel 230. The weir 340 forms an annular confined volume 370 within vessel 330 between the weir 340 and the gas inlet tube. In the embodiment of FIG. 4, twelve sparge ports 324 are disposed near the bottom of the gas inlet tube 322. The sparge ports 324 in this example are substantially rectangular in shape, although other shapes may be used. Additionally, the sparge ports 324 of this embodiment are arranged generally parallel to the flow direction of the gas/liquid phase, further reducing the possibility of the sparge ports 324 becoming clogged.

The heated gas exits the gas inlet tube 322 through the sparge ports 324 into the confined volume 370 formed between the gas inlet tube 322 and the tubular shaped weir 340. In this case, the weir 340 has a circular cross-sectional shape and encircles the lower end of the gas inlet tube 322. Additionally, the weir 340 is located at an elevation which creates a lower circulation gap 336 between a first end 341 of the weir 340 and a bottom dished surface 331 of the vessel 330. The second end 342 of the weir 340 is located at an elevation below a normal or at rest operating level of the process fluid 390 within the vessel 330. Further, a baffle or shield 338 is disposed within the vessel 330 above the second end 342 of the weir 340. The baffle 338 is circular in shape and extends radially outwardly from the gas inlet tube 322. Additionally, the baffle 338 is illustrated as having an outer diameter somewhat greater than the outer diameter of the weir 340. However, the baffle 338 may have the same, a greater or smaller diameter than the diameter of the weir 340 if desired. Several support brackets 333 are mounted to the bottom surface 331 of the vessel 330 and are attached to the weir 340 near the first end 341 of the weir 340. Additionally, a gas inlet tube stabilizer ring 335 is attached to the support brackets 333 and substantially surrounds the bottom end 326 of the gas inlet tube 322 to stabilize the gas inlet tube 322 during operation.

During operation headed gas is ejected through the sparge ports 324 into the confined volume 370 between the gas inlet tube 322 and the weir 342 creating a mixture of gas and process fluid 390 within the confined volume 370 that is significantly reduced in bulk density compared to the average bulk density of the fluid located in a volume 371 outside of the wall of the weir 340. This reduction in bulk density of the gas/liquid mixture within confined volume 370 creates an imbalance in head pressure at all elevations between the process fluid 390 surface and the first end 341 of the weir 340 The reduced head pressure induces a flow pattern of liquid from the higher head pressure regions of volume 371 through the circulation gap 336 and into the confined volume 370. Once established, this induced flow pattern provides vigorous mixing action both within the confined volume 370 and throughout the volume 371 as liquid from the surface and all locations within the volume 371 is drawn downward through the circulation gap 336 and upward through the confined volume 370 where the gas/liquid mixture flows outward over the second end 342 of the weir 340 and over the surface confined within the vessel 330.

At the point where gas/liquid mixture flowing upward within confined volume 370 reaches the elevation of the surface and having passed beyond the second edge 342 of the weir 340, the difference in head pressure between the gas/liquid mixture within the confined volume 370 and the gas/liquid mixture within volume 371 is eliminated. Absent the driving force of differential head pressure and the confining effect of the wall of the weir 340, gravity and the resultant buoyancy of the gas phase within the liquid phase become the primary outside forces affecting the continuing flow patterns of the gas/liquid mixture exiting the confined space 370. The combination of the force of gravity and the barrier created by the baffle 338 in the vertical direction eliminates the vertical velocity and momentum components of the flowing gas/liquid mixture at or below the elevation of the bottom of the baffle 338 and causes the velocity and momentum vectors of the flowing gas/liquid mixture to be directed outward through a gap 339 created by the second end 342 of the weir 340 and the bottom surface of the baffle 338 and downwards near the surface within the vessel 230. Discrete and discontinuous regions of gas coalesce and ascend vertically within the continuous liquid phase. As the ascending gas regions within the gas/liquid mixture reach the surface, buoyancy causes the discontinuous gas phase to break through the surface and to coalesce into a continuous gas phase that is directed upward within the confines of the vessel 330 and into a gas exit port 360 under the influence of the differential pressure created by the blower or blowers (not shown in FIG. 4). The fluid scrubber 222 of FIG. 3 may be fluidly connected to the gas exit port 360 of FIG. 4 to perform the hazardous substance removal described above.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A method of removing PFAS from a liquid, the method comprising:
    providing a source of heat energy;
    moving heat energy through a direct contact liquid concentrator, the direct contact liquid concentrator comprising:
        a gas inlet;
        a gas outlet;
        a liquid inlet; and
        a mixing chamber connecting the gas inlet and the gas outlet, combining a liquid comprising PFAS with a gas stream including the heat energy from the gas inlet in the mixing chamber, thereby creating a gas and liquid mixture, the heat energy at least partially evaporating the liquid; and
    removing entrained liquid droplets greater than 9 microns in size from the gas and liquid mixture, thereby producing a substantially liquid free gas stream and a liquid residual comprising PFAS.

2. The method of claim 1, wherein removing entrained liquid droplets includes removing entrained liquid droplets greater than 5 microns in size.

3. The method of claim 2, wherein removing entrained liquid droplets includes removing entrained liquid droplets greater than 1 micron in size.

4. The method of claim 1, further comprising passing the substantially liquid free gas stream through a vapor condenser.

5. The method of claim 4, further comprising changing vapor phase PFAS in the substantially liquid free gas stream into PFAS condensate in the vapor condenser.

6. The method of claim 1, further comprising injecting a PFAS binding agent into one of the liquid comprising PFAS or the liquid residual comprising PFAS.

7. The method of claim 6, wherein the PFAS binding agent comprises an adsorbent.

8. The method of claim 7, wherein the adsorbent comprises granulated activated carbon.

9. The method of claim 6, wherein injecting the PFAS binding agent into the liquid residual comprising PFAS produces a sludge.

10. The method of claim 9, wherein the sludge comprises PFAS bound from the liquid residual comprising PFAS.

11. The method of claim 1, further comprising thermally destroying vapor phase PFAS in the substantially liquid free gas stream.

12. The method of claim 11, wherein thermally destroying vapor phase PFAS in the substantially liquid free gas stream includes passing the substantially liquid free gas stream through a thermal oxidizer.

13. The method of claim 12, wherein the thermal oxidizer is fueled by one of natural gas, landfill gas, or propane.

14. The method of claim 1, wherein removing entrained liquid droplets from the gas and liquid mixture includes removing solid PFAS particles bound to entrained liquid particles.

15. The method of claim 1, wherein removing entrained liquid droplets from the gas and liquid mixture includes removing ionic PFAS traveling in mist.

16. The method of claim 1, further comprising sending the liquid residual comprising PFAS to a landfill.

17. The method of claim 1, wherein the liquid comprising PFAS comprises landfill leachate.

18. The method of claim 1, wherein the liquid comprising PFAS comprises industrial waste water.

* * * * *